United States Patent
Kunieda et al.

(10) Patent No.: US 7,462,216 B2
(45) Date of Patent: Dec. 9, 2008

(54) HONEYCOMB UNIT AND HONEYCOMB STRUCTURE

(75) Inventors: Masafumi Kunieda, Ibi-gun (JP); Yuki Fujita, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/927,091

(22) Filed: Oct. 29, 2007

(65) Prior Publication Data
US 2008/0083202 A1    Apr. 10, 2008

Related U.S. Application Data

(63) Continuation of application No. PCT/JP2006/316622, filed on Aug. 24, 2006.

(30) Foreign Application Priority Data
Oct. 12, 2005  (JP) ............................. 2005-297858

(51) Int. Cl.
| | |
|---|---|
| B01D 24/00 | (2006.01) |
| B01D 39/00 | (2006.01) |
| B01D 46/00 | (2006.01) |
| B01D 41/00 | (2006.01) |
| B01D 59/50 | (2006.01) |
| B01D 50/00 | (2006.01) |
| B01D 39/14 | (2006.01) |

(52) U.S. Cl. .................. 55/523; 55/502; 55/385.3; 55/524; 55/522; 55/422; 55/483

(58) Field of Classification Search ........... 55/385.3, 55/522, 523, 486, 502, 422, 524
See application file for complete search history.

(56) References Cited

U.S. PATENT DOCUMENTS

| | | |
|---|---|---|
| 5,720,787 A | 2/1998 | Kasai et al. |
| 5,914,187 A | 6/1999 | Naruse et al. |
| 6,206,944 B1 | 3/2001 | Hickman |
| 6,669,751 B1 * | 12/2003 | Ohno et al. .................... 55/523 |
| 7,112,233 B2 | 9/2006 | Ohno et al. |
| 7,309,370 B2 | 12/2007 | Kudo et al. |
| 2003/0093982 A1 | 5/2003 | Suwabe et al. |
| 2003/0165662 A1 | 9/2003 | Suwabe et al. |
| 2004/0131772 A1 | 7/2004 | Yamada et al. |
| 2004/0161596 A1 | 8/2004 | Taoka et al. |

(Continued)

FOREIGN PATENT DOCUMENTS

| | | |
|---|---|---|
| EP | 1338322 | 8/2003 |
| EP | 1486242 | 12/2004 |
| EP | 1489274 | 12/2004 |
| EP | 1500481 | 1/2005 |
| EP | 1502640 | 2/2005 |

(Continued)

*Primary Examiner*—Walter D Griffin
*Assistant Examiner*—Amber Miller Harris
(74) *Attorney, Agent, or Firm*—Ditthavong Mori & Steiner, P.C.

(57) ABSTRACT

A honeycomb unit includes a plurality of walls and a plurality of cells. The plurality of cells are defined by the plurality of walls and extend along a longitudinal direction of the honeycomb unit. Each of the plurality of cells has opposite first and second end portions along the longitudinal direction. Either one of the first and second end portions is sealed. X and Y satisfy a following relationship, $100/3 \cdot X + 5 \leq Y \leq 100/3 \cdot X + 40$, wherein Y is a ratio of a weight of an unsealed region in said cells to a weight of a sealed region in said cells and X is a ratio of a length in the longitudinal direction of said honeycomb unit to an area of a cross-section perpendicular to the longitudinal direction of said honeycomb unit. X is at least about 0.1 and at most about 0.26.

23 Claims, 6 Drawing Sheets

A-A line cross-sectional view

U.S. PATENT DOCUMENTS

| | | | |
|---|---|---|---|
| 2004/0261384 A1* | 12/2004 | Merkel et al. | 55/523 |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0178098 A1 | 8/2005 | Ono et al. | |
| 2005/0180898 A1 | 8/2005 | Yamada | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0021310 A1 | 2/2006 | Ohno et al. | |
| 2006/0029769 A1 | 2/2006 | Ichikawa et al. | |
| 2006/0051556 A1 | 3/2006 | Ohno et al. | |
| 2006/0150598 A1 | 7/2006 | Ichikawa et al. | |
| 2006/0154021 A1 | 7/2006 | Ohno et al. | |
| 2006/0159602 A1 | 7/2006 | Ohno et al. | |
| 2006/0166820 A1 | 7/2006 | Ogyu et al. | |
| 2006/0210765 A1 | 9/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0254231 A1 | 11/2006 | Hayashi et al. | |
| 2007/0020155 A1 | 1/2007 | Ohno et al. | |
| 2007/0028575 A1 | 2/2007 | Ohno et al. | |
| 2007/0039298 A1* | 2/2007 | Tokumaru | 55/523 |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0169453 A1 | 7/2007 | Hayakawa | |
| 2007/0178275 A1 | 8/2007 | Takahashi | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0204580 A1 | 9/2007 | Kunieda | |
| 2007/0212517 A1 | 9/2007 | Ohno et al. | |
| 2007/0293392 A1 | 12/2007 | Ohno et al. | |

FOREIGN PATENT DOCUMENTS

| | | |
|---|---|---|
| EP | 1679109 | 7/2006 |
| JP | 08-243329 | 9/1996 |
| JP | 08-281034 | 10/1996 |
| JP | 2003-003823 | 1/2003 |
| JP | 2003-126629 | 5/2003 |
| JP | 2003-236322 | 8/2003 |
| JP | 2004-168030 | 6/2004 |
| JP | 2005-125237 | 5/2005 |
| JP | 2005-125318 | 5/2005 |
| WO | WO 2004/052502 | 6/2004 |
| WO | WO 2004/085029 | 10/2004 |

* cited by examiner

A-A line cross-sectional view

C-C line cross-sectional view

HONEYCOMB UNIT AND HONEYCOMB STRUCTURE

CROSS-REFERENCE TO RELATED APPLICATIONS

This application is a continuation application of PCT/JP2006/316622 filed on Aug. 24, 2006, which claims priority of Japanese Patent Application No. 2005-297858 filed on Oct. 12, 2005. The contents of these applications are incorporated herein by reference in their entirety.

BACKGROUND OF THE INVENTION

1. Field of the Invention

The present invention relates to a honeycomb unit, and a honeycomb structure having the honeycomb unit as a component member.

2. Discussion of the Background

Recently, particulates, such as soot, contained in exhaust gases that are discharged from internal combustion engines for vehicles such as a bus, a truck and the like, construction equipment and the like, have raised serious problems as contaminants harmful to the environment and the human body.

For this reason, various applications in which honeycomb structures, which are made from porous ceramics, are used as filters for capturing particulates in exhaust gases to purify the exhaust gases have been proposed.

Conventionally, as this kind of honeycomb structure, proposed is a gas purifying filter with a honeycomb structure having a large number of cells, each surrounded by a partition wall, where either one end of both ends of the cell is closed by a plug portion, wherein both the partition wall and the plug portion are porous bodies, and a relationship between the porosity of the partition wall, porosity of the plug portion, an average value of the thickness of the partition wall and an average value of the length of the plug portion satisfies a predetermined relationship (for example, see JP-A 2003-003823).

Further, materials known for the conventional honeycomb structure are materials such as silicon carbide and cordierite.

The contents of JP-A 2003-003823 are incorporated herein by reference in their entirety.

SUMMARY OF THE INVENTION

A honeycomb unit according to a first aspect of the present invention includes a plurality of walls and a plurality of cells. The plurality of cells are defined by the plurality of walls and extend along a longitudinal direction of the honeycomb unit. Each of the plurality of cells has opposite first and second end portions along the longitudinal direction. Either one of the first and second end portions is sealed. X and Y satisfy a following relationship, $100/3 \cdot X + 5 \leq Y \leq 100/3 \cdot X + 40$, wherein Y is a ratio of a weight of an unsealed region in the cells to a weight of a sealed region in the cells and X is a ratio of a length in the longitudinal direction of the honeycomb unit to an area of a cross-section perpendicular to the longitudinal direction of the honeycomb unit. X is at least about 0.1 and at most about 0.26.

In the above-mentioned honeycomb unit, an apparent density of the unsealed region in the cells of the honeycomb unit is desirably at least about 0.4 g/cm$^3$ and at most about 0.7 g/cm$^3$, and an apparent density of the sealed region in the cells of the honeycomb unit is desirably at least about 0.4 g/cm$^3$ and at most about 2.0 g/cm$^3$.

Moreover, the honeycomb unit desirably includes silicon carbide based ceramics.

Moreover, the honeycomb unit and the plug of the sealed region desirably include the same porous ceramic, and the honeycomb unit and the plug of the sealed region desirably include silicon carbide based ceramics.

Furthermore, a catalyst is desirably supported on the honeycomb unit.

A honeycomb structure of a second aspect of the present invention includes a plurality of honeycomb units and at least one adhesive layer bonding the plurality of honeycomb units. Each of the plurality of honeycomb units includes a plurality of walls and a plurality of cells. The plurality of cells are defined by the plurality of walls and extend along a longitudinal direction of the honeycomb unit. Each of the plurality of cells has opposite first and second end portions along the longitudinal direction. Either one of the first and second end portions is sealed. X and Y satisfy a following relationship, $100/3 \cdot X + 5 \leq Y \leq 100/3 \cdot X + 40$, wherein Y is a ratio of a weight of an unsealed region in the cells to a weight of a sealed region in the cells and X is a ratio of a length in the longitudinal direction of the honeycomb unit to an area of a cross-section perpendicular to the longitudinal direction of the honeycomb unit. X is at least about 0.1 and at most about 0.26.

In the honeycomb structure of the second aspect of the present invention, in at least one of the honeycomb units, an apparent density of the unsealed region in the cells is desirably at least about 0.4 g/cm$^3$ and at most about 0.7 g/cm$^3$, and an apparent density of the sealed region in the cells is desirably at least about 0.4 g/cm$^3$ and at most about 2.0 g/cm$^3$.

Further, at least one of the honeycomb units includes silicon carbide based ceramics.

Moreover, in the honeycomb structure, in at least one of the honeycomb units, the honeycomb unit and the plug of the sealed region desirably include the same porous ceramic, and the honeycomb unit and the plug of the sealed region desirably include silicon carbide based ceramics.

Further, a catalyst is desirably supported on the honeycomb structure of the second aspect of the present invention, and the honeycomb structure is desirably applied to an exhaust gas purifying device for a vehicle.

A honeycomb structure of a third aspect of the present invention includes one honeycomb unit. The honeycomb unit includes a plurality of walls and a plurality of cells. The plurality of cells are defined by the plurality of walls and extend along a longitudinal direction of the honeycomb unit. Each of the plurality of cells has opposite first and second end portions along the longitudinal direction. Either one of the first and second end portions is sealed. X and Y satisfy a following relationship, $100/3 \cdot X + 5 \leq Y \leq 100/3 \cdot X + 40$, wherein Y is a ratio of a weight of an unsealed region in the cells to a weight of a sealed region in the cells and X is a ratio of a length in the longitudinal direction of the honeycomb unit to an area of a cross-section perpendicular to the longitudinal direction of the honeycomb unit. X is at least about 0.1 and at most about 0.26.

In the honeycomb structure according to the third aspect of the present invention, an apparent density of the unsealed region in the cells of the honeycomb unit is desirably at least about 0.4 g/cm$^3$ and at most about 0.7 g/cm$^3$, and an apparent density of the sealed region in the cells of the honeycomb unit is desirably at least about 0.4 g/cm$^3$ and at most about 2.0 g/cm$^3$.

Further, the honeycomb unit desirably includes cordierite or aluminum titanate.

Also, in the honeycomb structure, the honeycomb unit and the plug of the sealed region include the same porous ceramic, and the honeycomb unit and the plug of the sealed region include cordierite or aluminum titanate.

Furthermore, a catalyst is desirably supported on the honeycomb structure of the third aspect of the present invention, and the honeycomb structure is desirably applied to an exhaust gas purifying device for a vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
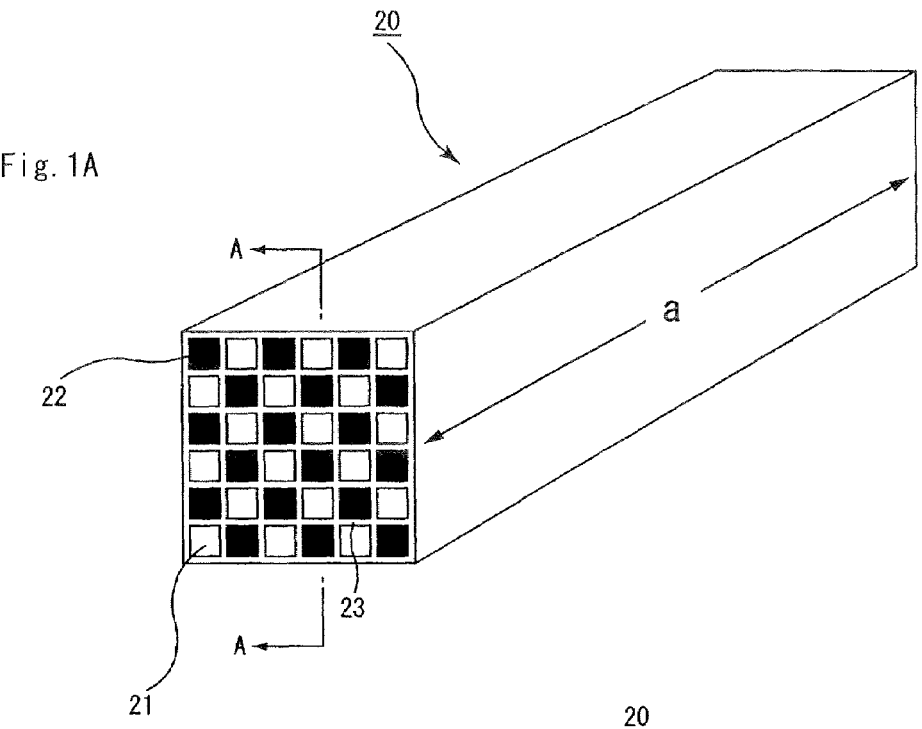
FIG. 1A is a perspective view showing one example of the honeycomb unit according to one embodiment of the first aspect of the present invention.

The embodiments will now be described with reference to the accompanying drawings, wherein like reference numerals designate corresponding or identical elements throughout the various drawings.

The honeycomb unit according to embodiments of the first aspect of the present invention is a honeycomb unit having a plurality of cells which are allowed to penetrate in a longitudinal direction with a wall portion therebetween. Each of the cells has a first end portion and a second end portion which are located at opposite side edges of the cell in the longitudinal direction of the honeycomb unit. Either of the first and second end portions of each cell is sealed.

Supposing that: a ratio of a weight of an unsealed region in the cells (hereinafter also referred to as a base portion) to a weight of a sealed region in the cells (hereinafter also referred to as a plugged portion) is Y, and a ratio of a length in the longitudinal direction of the honeycomb unit to an area of a cross-section perpendicular to the longitudinal direction of the honeycomb unit (hereinafter also referred to as an aspect ratio of the honeycomb unit) is X, these X and Y are allowed to satisfy the following inequality (1):

$$100/3 \cdot X + 5 \leq Y \leq 100/3 \cdot X + 40 \quad (1)$$

(wherein at least about $0.1 \leq X \leq$ and at most about 0.26).

The honeycomb unit according to embodiments of the first aspect of the present invention, since the above-mentioned X and Y satisfy the inequality (1), deviation of heat generation between the sealed region in the cells and the unsealed region in the cells becomes easier to be made smaller so that it becomes difficult for damages such as cracks to occur in the plugged portions of the cells and the periphery thereof at the time of the regenerating process and the like, thereby obtaining a superior durability.

The ratio Y of the weight of the base portion to the weight of the plugged portion of $(100/3 \cdot X + 5)$ or more becomes less likely to trap heat in the plugged portion; therefore, it becomes less likely to cause a temperature difference at the interface (see FIG. 2A) between the plugged portion and the base portion, and thus a damage at the time of regenerating process and the like becomes less likely to be caused at the periphery of this interface.

On the other hand, the ratio Y of $(100/3 \cdot X + 40)$ or less makes it difficult to make the maximum temperature of the exhaust gas flow-out side too high; thus, a damage to the plugged portion (especially to a plug) becomes less likely to be caused.

A honeycomb structure according to embodiments of the second aspect of the present invention including a plurality of honeycomb units bonded to one another by interposing an adhesive layer. Each of the honeycomb units has a plurality of cells which are allowed to penetrate in a longitudinal direction with a wall portion therebetween, with either one end portion of each of the cells being sealed.

In at least one of the honeycomb units, supposing that a ratio of a weight of an unsealed region in the cells to a weight of a sealed region in the cells is Y, and a ratio of a length in the longitudinal direction of the honeycomb unit to an area of a cross-section perpendicular to the longitudinal direction of the honeycomb unit is X, these X and Y are allowed to satisfy the following inequality (1):

$$100/3 \cdot X + 5 \leq Y \leq 100/3 \cdot X + 40 \quad (1)$$

(wherein at least about $0.1 \leq X \leq$ at most about 0.26).

In the honeycomb structure according to embodiments of the second aspect of the present invention, since at least one of the honeycomb units constituting the honeycomb structure is the honeycomb unit of the first aspect of the present invention, a deviation of heat generation at the sealed region in the cells and the unsealed region in the cells may become easier to be effectively prevented in the entire honeycomb structure. Therefore, in the honeycomb structure according to embodiments of the second aspect of the present invention, the plugged portion of the cells and the periphery thereof may prevent damages such as cracks at the time of the regenerating process and the like, thereby more easily obtaining an improved durability.

A honeycomb structure according to embodiments of the third aspect of the present invention including one honeycomb unit which has a plurality of cells which are allowed to penetrate in a longitudinal direction with a wall portion therebetween, with either one end portion of each of the cells being sealed.

In the honeycomb unit, supposing that a ratio of a weight of an unsealed region in the cells to a weight of a sealed region in the cells is Y, and a ratio of a length in the longitudinal direction of the honeycomb unit to an area of a cross-section perpendicular to the longitudinal direction of the honeycomb unit is X, these X and Y are allowed to satisfy the following inequality (1):

$$100/3 \cdot X + 5 \leq Y \leq 100/3 \cdot X + 40 \quad (1)$$

(wherein at least about $0.1 \leq X \leq$ at most about 0.26).

Moreover, in the honeycomb structure according to embodiments of the third aspect of the present invention, the honeycomb structure includes one honeycomb unit which is the honeycomb unit according to embodiments of the first aspect of the present invention. Therefore, a deviation of heat generation at the sealed region in the cells and the unsealed region in the cells may become easier to be effectively prevented in the entire honeycomb structure. Thus, in the honeycomb structure according to embodiments of the third aspect of the present invention, the plugged portion of the cells and the periphery thereof may prevent damages such as cracks at the time of the regenerating process and the like, thereby more easily obtaining an improved durability.

Generally, in a filter that is allowed to function as a filter for capturing particulates (hereinafter, referred to simply as PM) in exhaust gases, it is necessary to periodically burn and remove PM captured in the filter through methods such as post-injection (such a process of burning and eliminating PM is referred to as a regenerating process of the filter).

Here, the burning heat of PM is transmitted to the rear side (exhaust gas flow-out side) of the filter, and resultantly the temperature is likely to become higher at the rear side of the filter.

A thermal shock which occurs due to this rise in temperature of the filter may possibly damage the plugged portion and the periphery thereof.

In the embodiments of the present invention, it becomes easier to suppress the rise in temperature at the plugged portion of the cells and the thermal shock caused upon burning the PM, when a weight ratio of a sealed region in the cells and an unsealed region in the cells should be set to a predetermined value according to the shape of a honeycomb unit constituting a honeycomb structure. As a result, it becomes easier to prevent the plugged portions of the cells and the periphery thereof from being damaged by thermal shock.

With respect to the restricted reasoning and restricted condition described hereinafter, all the influence/effect, which are obtained when they are either fulfilled or not fulfilled, are to occur in the honeycomb structure having one honeycomb unit or the honeycomb structure having a plurality of honeycomb units.

Furthermore, the sealed region in the cells (the plugged portion) and the unsealed region in the cells (the base portion) will afterwards be described in detail, referring to the drawings.

The aspect ratio X of the honeycomb unit of about 0.1 or more makes it difficult for PM in exhaust gases to be accumulated on the rear side (exhaust gas flow-out side) of the obtained honeycomb unit since the length of the honeycomb unit is not too short with respect to the cross-section of the honeycomb unit; thus, since such local distribution of PM is less likely to be generated, damage to the honeycomb unit becomes less likely to be caused at the time of regenerating process and the like.

On the other hand, the aspect ratio X of about 0.26 or less makes it difficult for PM in exhaust gases to be accumulated on the front side (exhaust gas flow-in side) of the obtained honeycomb unit since the length of the honeycomb unit is not too long with respect to the cross-section of the honeycomb unit; and thus, also in this case, since such local distribution of PM is less likely to be generated, damages to the honeycomb unit becomes less likely to be caused at the time of regenerating process and the like.

Accordingly, in the embodiments of the above-mentioned honeycomb units, the PM in exhaust gases are desirably captured and accumulated evenly inside the honeycomb unit (inside the cells) to a certain amount.

In the embodiments of the present invention, the cross-section of the honeycomb unit refers to an area formed by the outer edge of the cross-section perpendicular to the longitudinal direction of the honeycomb unit.

In the embodiments of the above-mentioned honeycomb unit, with respect to an apparent density of the unsealed region in the cells (base portion) of the honeycomb unit, the lower limit value thereof is desirably about 0.4 g/cm$^3$ and the upper limit value thereof is desirably about 0.7 g/cm$^3$.

The apparent density of the unsealed region in the cells (base portion) of about 0.4 g/cm$^3$ or more is less likely to cause an insufficient strength in the honeycomb unit and less likely to cause breakage.

In contrast, the apparent density of the unsealed region in the cells (base portion) of about 0.7 g/cm$^3$ or less tends to make it easier for the honeycomb unit to reach a catalyst activation temperature. Namely, a catalyst that supports burning of the PM is desirably adhered to the honeycomb unit; such a catalyst normally has an appropriate temperature range at which it may function as a catalyst. Here, the apparent density of the unsealed region in the cells (base portion) of about 0.7 g/cm$^3$ or less does not make the thermal capacity of the honeycomb unit too high, making it easier to raise the temperature of the honeycomb unit up to the appropriate temperature range for activating the above-mentioned catalyst.

Moreover, with respect to an apparent density of the sealed region in the cells (plugged portion), although not particularly limited, the apparent density thereof is normally at least about 0.4 g/cm$^3$ and at most about 2.0 g/cm$^3$.

The apparent density of the plugged portion of about 0.4 g/cm$^3$ or more is less likely to reduce the strength of the sealed region in the cells (plugged portion) and less likely to cause damage thereto; in contrast, the apparent density of the plugged portion of about 2.0 g/cm$^3$ or less does not make the temperature difference due to the difference in thermal capacity between the sealed region in the cells (plugged portion) and the unsealed region too large, and it becomes easier to prevent this temperature difference from causing thermal stress that generates damage such as cracks.

Referring to the drawings, the following description will discuss the honeycomb unit according to the embodiments of the first aspect of the present invention.

Figure 1B:
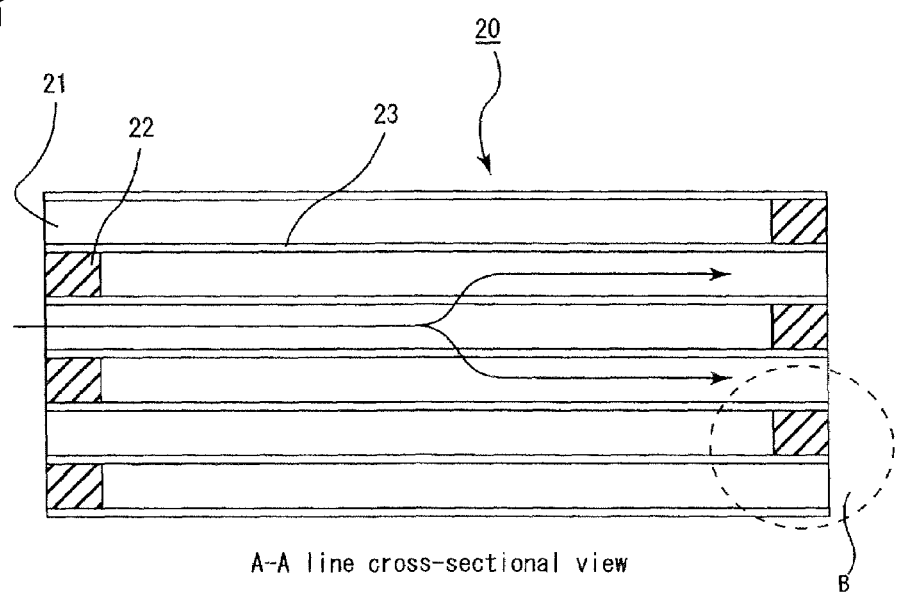
FIG. 1B is a cross-sectional view taken along line A-A of FIG. 1A.

FIG. 1A is a perspective view showing one example of the honeycomb unit according to one embodiment of the first aspect of the present invention, and FIG. 1B is a cross-sectional view taken along line A-A of the honeycomb unit shown in FIG. 1A.

As shown in FIGS. 1A and 1B, the honeycomb unit 20 has a plurality of cells 21 placed in parallel with one another in the longitudinal direction (the direction shown by an arrow a in FIG. 1A), and either of the end portions of the cells 21 is sealed with a plug 22 so that cell walls (wall portions) 23 that separate the cells 21 are allowed to function as filters. In other words, each of the cells 21 formed in the honeycomb unit 20 has either one of the end portions on the inlet side or the outlet side of exhaust gases sealed with the plug 22 as shown in FIG. 1B so that exhaust gases that have flowed into one of the cells 21 are allowed to flow out of another cell 21 after surely having passed through a cell wall 23 that separates the cells 21.

In the honeycomb unit 20, the relationship between the ratio Y of the weight of the base portion to the weight of the plugged portion and the aspect ratio X satisfies the above mentioned inequality (1); therefore, damages such as cracks becomes less likely to occur at the time of the regenerating process and the like.

Next, referring to FIGS. 2A and 2B, the sealed region in the cells (plugged portion) and the unsealed region in the cells (base portion) in the honeycomb unit according to the embodiments of the first aspect of the present invention will be described.

Figure 2A:
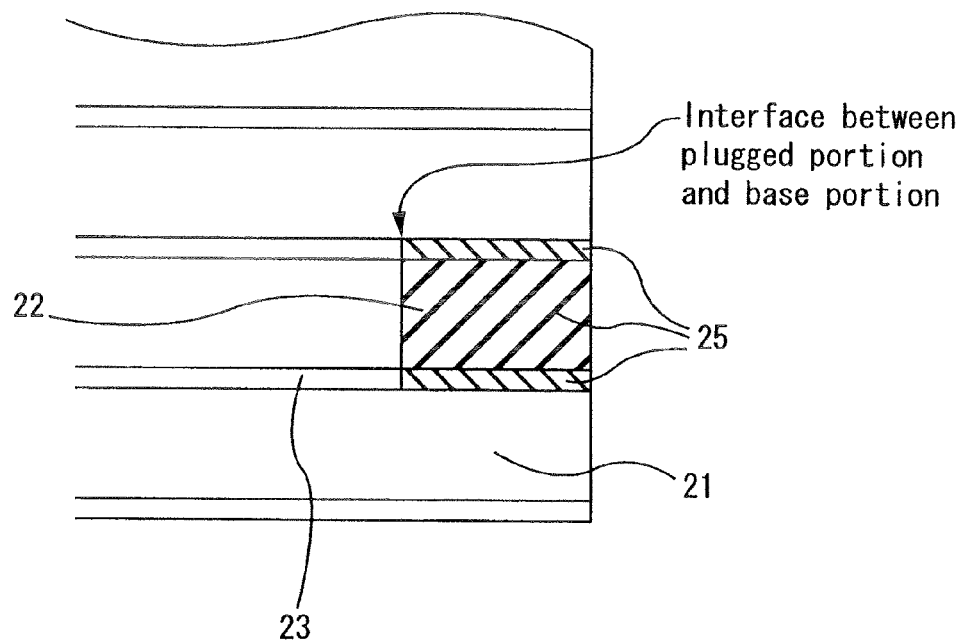
FIG. 2A is a fragmentally enlarged view of a region B of the honeycomb unit shown in FIG. 1B.
Figure 2B:
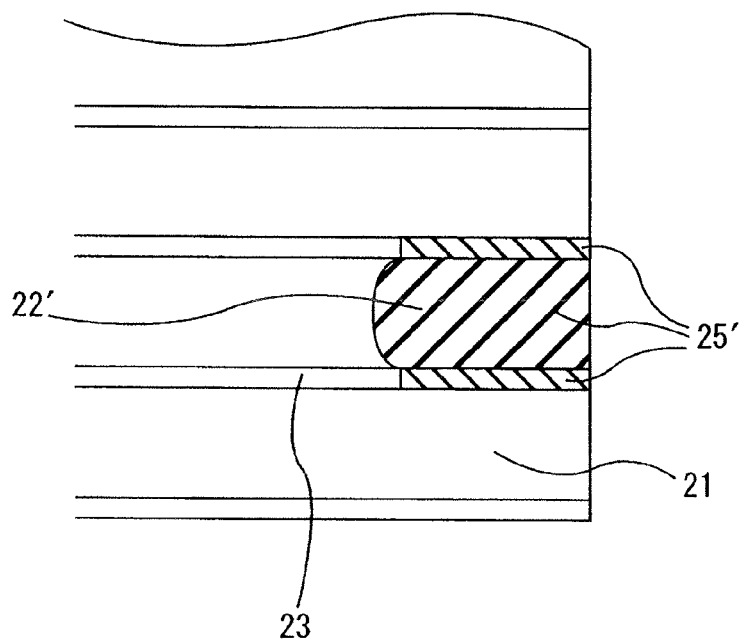
FIG. 2B is a fragmentally enlarged view of a honeycomb unit according to another embodiment in which the shape of the plugged portion is different.

FIG. 2A is a fragmentally enlarged view of a region B of the honeycomb unit shown in FIG. 1B, and FIG. 2B is a fragmentally enlarged view of a honeycomb unit according to another embodiment in which the shape of the plugged portion is different.

In the honeycomb unit according to the embodiments of the first aspect of the present invention, the plugged portion corresponds to the shaded region shown in FIGS. 2A and 2B, and refers to a region 25 (shaded area) including the end portion of the cell sealed by the plug 22 and the cell wall that contacts the plug 22.

Also, the unsealed region in the cells (base portion) refers to the region other than the plugged portion 25 in the honeycomb unit 20 (see, FIGS. 2A and 2B) in which the end portion is sealed.

Here, in the honeycomb unit according to the embodiments of the first aspect of the present invention, the shape of the plug used for sealing the end portion of the honeycomb unit is not necessarily configured so as to have a flat surface as shown in FIG. 2A at the inside of the honeycomb unit, and for example, the shape may have a surface convexly curving to the inside and the like as shown in FIG. 2B, or on the contrary, a concavely curved surface and the like. In such cases also, the plugged portion referred to in the embodiments of the first aspect of the present invention corresponds to a region 25' (shaded area in the figure) covered by a plug 22' and the cell wall that contacts with the plug 22'. The base portion here also refers to the region other than the plugged portion 25' of the honeycomb unit.

The honeycomb unit is mainly made from porous ceramics, and examples of the material include nitride ceramics such as aluminum nitride, silicon nitride, boron nitride and titanium nitride; carbide ceramics such as silicon carbide, zirconium carbide, titanium carbide, tantalum carbide and tungsten carbide; and oxide ceramics such as alumina, zirconia, cordierite, mullite, silica and aluminum titanate, and the like. Here, the honeycomb unit may be formed as a composite body of silicon and silicon carbide. In the case where the composite body of silicon and silicon carbide is used, silicon is desirably added thereto to make up to 0% by weight to about 45% by weight of the entire body.

With respect to the material of the honeycomb unit, a silicon carbide based ceramic which is superior in heat resistance and mechanical characteristics, and in addition, has a high thermal conductivity, is desirably used. Here, the silicon carbide based ceramic refers to a material having a silicon carbide content of about 60% by weight or more.

Moreover, with respect to the average pore diameter of the honeycomb unit, although not particularly limited, the lower limit value is desirably about 1 μm, and the upper limit value is desirably about 50 μm. More desirably, the lower limit value is about 5 μm, and the upper limit value is about 30 μm. The average pore diameter of about 1 μm or more is not likely to make the pressure loss become high, whereas the average pore diameter of about 50 μm or less makes it difficult for PM to pass through the pores, thereby making it easier to capture the PM sufficiently and to improve the capture efficiency of PM.

In the above-mentioned honeycomb unit, the lower limit of the porosity is desirably about 20%, and the upper limit thereof is desirably about 80%, although not limited thereto. More desirably, the lower limit is about 30% and the upper limit is about 60%. The porosity of about 20% or more makes it less likely to clog the pores of the honeycomb unit, whereas the porosity of about 80% or less makes it less likely to cause a reduction in the strength of the honeycomb unit and less likely to easily destroy the honeycomb unit.

Here, the porosity can be measured through known methods such as a mercury injection method, Archimedes method and a measuring method using a scanning electron microscope (SEM).

The length of the honeycomb unit in the longitudinal direction is not particularly limited as long as the aspect ratio X satisfies the above-mentioned inequality (1), the length of at least about 100 mm and at most about 300 mm is desirable.

The length of the honeycomb unit of about 100 mm or more makes it less likely to accumulate the PM in exhaust gases on the exhaust gas flow-out side, whereas the length of about 300 mm or less makes it less likely to accumulate the PM in exhaust gases on the exhaust gas flow-in side.

When used in the honeycomb structure according to the embodiments of the second aspect of the present invention described later, the area of the cross-section perpendicular to the longitudinal direction of the honeycomb unit is not particularly limited as long as the aspect ratio X satisfies the above-mentioned inequality (1), and normally, the area is desirably at least about 5 $cm^2$ and at most about 50 $cm^2$.

The cross-sectional area of about 5 $cm^2$ or more increases the filtering area of honeycomb unit as the filter, whereas the cross-sectional area of about 50 $cm^2$ or less makes it less likely to damage the honeycomb unit due to thermal stress caused inside the filter.

Moreover, with respect to the thickness of the cell wall in the honeycomb unit of the embodiments, the lower limit value thereof is desirably about 0.1 mm, and the upper limit value thereof is desirably about 0.4 mm.

The thickness of the cell wall of about 0.1 mm or more is less likely to cause too much reduction in strength of the honeycomb unit, whereas the thickness of the cell wall of about 0.4 mm or less is less likely to cause too much increase in the pressure loss.

The plug 22 that seals the end portion of the honeycomb unit as well as the cell wall 23 are desirably made from the same porous ceramic material. With this arrangement, the contact strength between the two members becomes easier to be increased, and by adjusting the porosity of the plug 22 in the same manner as the cell walls 23, the coefficient of thermal expansion of the cell walls 23 and the coefficient of thermal expansion of the plug 22 are properly adjusted so that it becomes easier to prevent a gap from being generated between the plug 22 and the cell walls 23 due to a thermal stress upon production and in use and also to prevent cracks from occurring in the plug 22 and at portions of the cell walls 23 that are made in contact with the plug 22. Here, the cell walls refer to both of the cell wall separating the cells 21 and the peripheral portion.

For example, when the honeycomb unit includes silicon carbide based ceramics, the plug that seals an end portion of the honeycomb unit desirably includes silicon carbide based ceramic.

With respect to the length of the plug 22, although not particularly limited, in the case where the plug 22 includes porous silicon carbide, for example, the lower limit thereof is desirably about 1 mm, while the upper limit thereof is desirably about 10 mm.

The length of the plug of about 1 mm or more makes it easier to securely seal the end portion of the cells, whereas the length of the plug of about 10 mm or less makes it less likely to cause too much reduction in the effective filtering area of the honeycomb unit, and less likely to make the porosity of the plug to become too high when the above-mentioned inequality (1) is to be satisfied.

More desirably, the lower limit value of the length of the plug is about 2 mm and the upper limit value thereof is about 9 mm.

The embodiments of a method for manufacturing such a honeycomb unit will be described together with a method for manufacturing the honeycomb structure according to the embodiments of the second aspect of the present invention, mentioned hereinafter.

According to the honeycomb unit according to the embodiments of the first aspect of the present invention, since the above-mentioned X and Y satisfy the inequality (1), deviation of heat generation between the sealed region in the cells and the unsealed region in the cells becomes easier to be made smaller so that it becomes difficult for damages such as cracks to occur in the plugged portions of the cells and the periphery thereof at the time of the regenerating process and the like, thereby obtaining a superior durability.

Next, the honeycomb structure according to the embodiments of the second aspect of the present invention will be described.

A honeycomb structure according to the embodiments of the second aspect of the present invention including a plurality of honeycomb units bonded to one another by interposing an adhesive layer. Each of the honeycomb units has a plurality of cells which are allowed to penetrate in a longitudinal direction with a wall portion therebetween, with either one end portion of each of the cells being sealed.

In at least one of the honeycomb units, supposing that:
a ratio of a weight of an unsealed region in the cells to a weight of a sealed region in the cells is Y, and a ratio of a length in the longitudinal direction of the honeycomb unit to an area of a cross-section perpendicular to the longitudinal direction of the honeycomb unit is X, these X and Y are allowed to satisfy the following inequality (1):

$$100/3 \cdot X + 5 \leq Y \leq 100/3 \cdot X + 40 \quad (1)$$

(wherein at least about $0.1 \leq X \leq$ at most about 0.26).

More specifically, at least one of the honeycomb units is the honeycomb unit according to the embodiments of the first aspect of the present invention (hereinafter, such a honeycomb structure is referred to also as a separate-type honeycomb structure).

Referring to the drawings, the following description will discuss the honeycomb structure according to the embodiments of the second aspect of the present invention.

Figure 3:
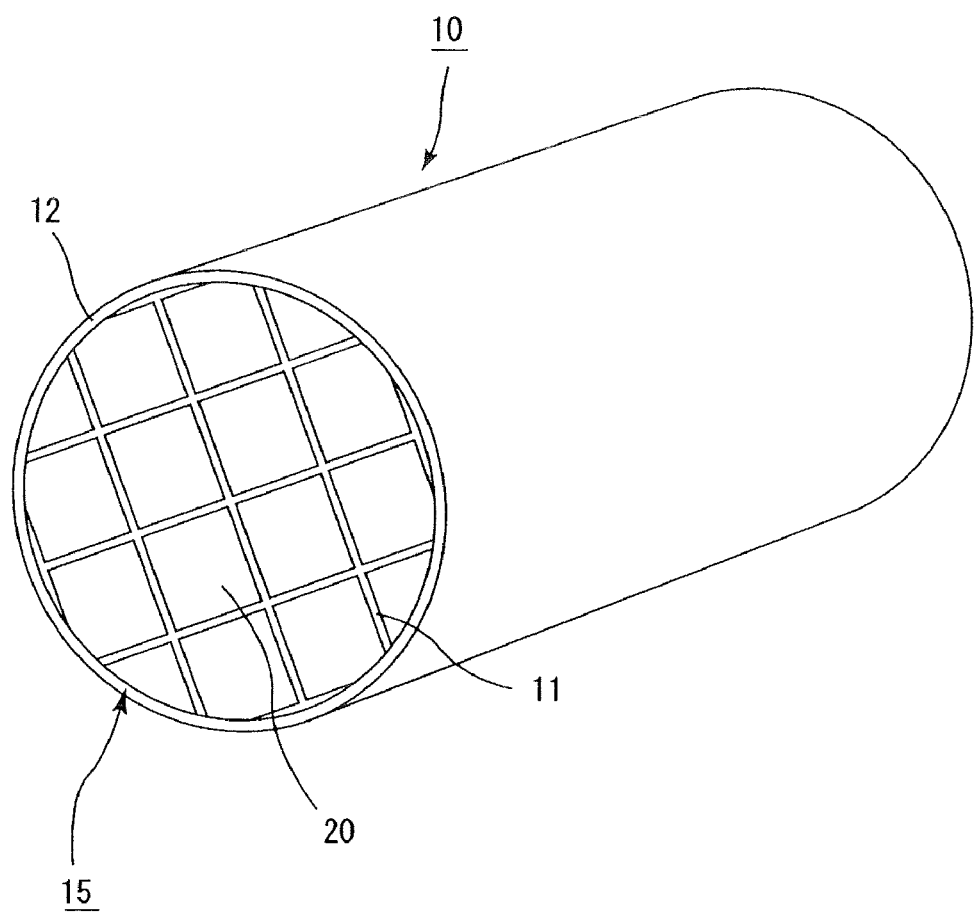
FIG. 3 is a perspective view that schematically shows one example of the honeycomb structure according to one embodiment of the second aspect of the present invention.

FIG. 3 is a perspective view that schematically shows one example of the honeycomb structure according to one embodiment of the second aspect of the present invention.

As shown in FIG. 3, in the honeycomb structure (separate-type honeycomb structure) 10, a plurality of honeycomb units 20 made from silicon carbide based ceramics or the like are combined with each other by interposing sealing material layers (adhesive layers) 11 to form a round pillar-shaped ceramic block 15, and a sealing material layer (coat layer) 12 is formed on the periphery of this ceramic block 15.

With respect to the separate-type honeycomb structure 10 shown in FIG. 3, although the shape of the ceramic block is a round pillar-shape, the shape of the ceramic block is not limited to the round pillar-shape as long as it has a shape of a pillar, and may be, for example, a cylindroid shape, a rectangular pillar shape or the like, and also may be any other shape.

Furthermore, in at least one of the honeycomb units 20, the ratio Y of the weight of the base portion to the weight of the plugged portion and the aspect ratio X satisfy the above-mentioned inequality (1); therefore, damages such as cracks become less likely to occur to the separate-type honeycomb structure 10 at the time of the regenerating process and the like.

Accordingly, in the honeycomb structure according to the embodiments of the second aspect of the present invention which is a separate-type honeycomb structure, all the honeycomb units are not necessarily the honeycomb unit according to the embodiments of the first aspect of the present invention which satisfies the above-mentioned inequality (1), and it is satisfactory if at least one of the honeycomb units is the honeycomb unit according to the embodiments of the first aspect of the present invention which satisfies the above-mentioned inequality (1).

Here, the higher the proportion of the honeycomb unit according to the embodiments of the first aspect of the present invention satisfying the above-mentioned inequality (1) among the plurality of the honeycomb units constituting the honeycomb structure is, the more it is desirable.

This is because the honeycomb structure according to the embodiments of the second aspect of the present invention may obtain an improved durability against thermal shock.

In the separate-type honeycomb structure 10, the sealing material layer (adhesive layer) 11, is formed between the honeycomb units 20, allowed to have a function that prevents leakage of exhaust gases, and also functions as a bonding material used for binding a plurality of the porous honeycomb units 20 to one another. In contrast, the sealing material layer (coat layer) 12, which is formed on the peripheral face of the ceramic block 15, is also allowed to function as a plug used for preventing exhaust gases passing through the cells from leaking from the peripheral face of the ceramic block 15 when the separate-type honeycomb structure 10 is placed in an exhaust passage of an internal combustion engine, and as an reinforcing member used for adjusting the shape and strengthening the peripheral portion of the ceramic block 15.

Here, in the separate-type honeycomb structure 10, the adhesive layer 11 and the coat layer 12 may be formed by using the same material, or may be formed by using different materials. In the case where the adhesive layer 11 and the coat layer 12 are made from the same material, the compounding ratio of materials thereof may be the same or may be different. Moreover, the material may have either a dense structure or a porous structure.

Examples of the material used for forming the adhesive layer 11 and the coat layer 12 include, although not particularly limited, a material including inorganic fibers and/or inorganic particles in addition to an inorganic binder and an organic binder.

Examples of the material to the above-mentioned inorganic binder include silica sol, alumina sol and the like. Each of these materials may be used alone, or two or more kinds of these may be used in combination. Of the above-mentioned inorganic binders, silica sol is more desirably used.

Examples of the organic binder include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Examples of the inorganic fibers include ceramic fiber such as alumina, silica, silica-alumina, glass, potassium titanate, aluminum borate mullite, and the like. Examples thereof may further include whiskers such as alumina, silica, zirconia, titania, ceria, mullite, silicon carbide and the like. Each of these may be used alone, or two or more kinds of these may be used in combination. Among the inorganic fibers, alumina fibers are more desirably used.

Examples of the inorganic particles include carbides, nitrides and the like, more specifically, inorganic powder including silicon carbide, silicon nitride, boron nitride and the like. Each of these may be used alone, or two or more kinds of these may be used in combination. Among the above-mentioned inorganic particles, silicon carbide, which is superior in thermal conductivity, is more desirably used.

Moreover, balloons that are fine hollow spheres including oxide-based ceramics and a pore-forming agent such as spherical acrylic particles or graphite may be added to the above-mentioned paste used for forming the sealing material layer, if necessary.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Moreover, the honeycomb structure according to the embodiments of the second aspect of the present invention desirably supports a catalyst thereon.

In the honeycomb structure according to the embodiments of the second aspect of the present invention, by supporting a catalyst that is capable of converting toxic gas components such as CO, HC, NOx in exhaust gases, it becomes easier to convert toxic gas components in exhaust gases through a catalytic reaction. Further, by supporting a catalyst that helps the burning of PM, the PM may be easily burned and removed. Consequently, in the honeycomb structure according to the embodiments of the second aspect of the present invention, it becomes easier to improve the performance of converting gas components in exhaust gases, and to reduce the energy for burning the PM.

Although not particularly limited, examples of the catalyst include catalyst having noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table) and a transition metal element, may be supported.

Moreover, when the above-mentioned catalyst is adhered to the honeycomb structure, the catalyst may be adhered thereto after the surface has been preliminarily coated with a catalyst supporting layer including alumina or the like. With this arrangement, the specific surface area is made greater so that the degree of dispersion of the catalyst is improved and the reaction sites of the catalyst are more easily increased. Furthermore, it becomes easier to prevent sintering of the catalyst metal by the catalyst supporting layer.

Examples of the material for the catalyst supporting layer include oxide ceramics, such as alumina, titania, zirconia and silica.

Here, the separate-type honeycomb structure with catalyst supported thereon is allowed to function as a gas purifying device in the same manner as conventionally known DPFs (Diesel Particulate Filters) with a catalyst. Therefore, with respect to the case where the separate-type honeycomb structure of the present invention is used also as a catalyst supporting carrier, detailed description of the functions thereof is omitted.

Next, the following description will discuss a method for manufacturing the honeycomb structure according to the embodiments of the second aspect of the present invention (the separate-type honeycomb structure).

First, an extrusion-molding process is carried out by using material paste mainly including the above-mentioned ceramic material so that a square-pillar shaped ceramic molded body is manufactured.

With respect to the material paste, although not particularly limited, such paste as to set the porosity of a honeycomb unit after production to at least about 20% and at most about 80% is desirably used, and for example, a material paste prepared by adding a binder, a dispersant solution and the like to powder (ceramic powder) containing the above-mentioned ceramics may be used.

With respect to the particle diameter of the ceramic powder, although not particularly limited, the silicon carbide powder that tends not to cause the case where the size of the honeycomb structure manufactured by the following firing treatment becomes smaller than that of the honeycomb molded body after degreased is desirable, for example, those powders, prepared by combining 100 parts by weight of powders having an average particle diameter of at least about 3 $\mu$m and at most about 70 $\mu$m with at least about 5 parts by weight and at most about 65 parts by weight of powders having an average particle diameter of at least about 0.1 $\mu$m and at most about 1.0 $\mu$m, are preferably used.

Here, an oxidizing process may be carried out on the ceramic powder.

Examples of the above-mentioned binder include, although not particularly limited, methyl cellulose, carboxymethyl cellulose, hydroxyethyl cellulose, polyethylene glycol and the like.

In general, the compounding amount of the above-mentioned binder is desirably at least about 1 part by weight and at most about 15 parts by weight with respect to 100 parts by weight of the ceramic powder.

Examples of the dispersant solution include, although not particularly limited, an organic solvent such as benzene; alcohol such as methanol; water, and the like.

An appropriate amount of the above-mentioned dispersant solution is mixed therein so that the viscosity of the material paste is set within a fixed range.

The ceramic powder, the binder and dispersant solution are mixed by an attritor or the like, and sufficiently kneaded by a kneader or the like, and then the resulting material paste is extrusion-molded.

Moreover, a molding auxiliary may be added to the material paste, if necessary.

Examples of the molding auxiliary include, although not particularly limited, ethylene glycol, dextrin, fatty acid, fatty acid soap, polyvinyl alcohol and the like.

Moreover, balloons that are fine hollow spheres including oxide-based ceramics and a pore-forming agent such as spherical acrylic particles or graphite may be added to the above-mentioned material paste.

Examples of the above-mentioned balloons include, although not particularly limited, alumina balloons, glass micro-balloons, shirasu balloons, fly ash balloons (FA balloons), mullite balloons and the like. Among these, alumina balloons are more desirably used.

Next, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug material paste, which forms plugs, is injected into the end portion on the outlet side of the inlet-side group of cells and the end portion on the inlet side of the outlet-side group of cells so that the cells are sealed.

With respect to the plug material paste, although not particularly limited, such paste as to set the porosity of a plug manufactured through the succeeding processes to at least about 30% and at most about 75% is desirably used, and for example, the same paste as the material paste may be used.

Moreover, through this process, the amount of paste to be injected may be adjusted according to need, such that the length of the plug formed through the succeeding processes satisfies the above-mentioned inequality (1).

Next, degreasing (for example, at least about 200° C. and at most about 500° C.) and firing (for example, at least about 1400° C. and at most about 2300° C.) processes are carried out on the ceramic dried body filled with the plug material paste under predetermined conditions so that a honeycomb unit 20 that is constituted by a single sintered body as a whole, having a plurality of cells that are longitudinally disposed in parallel with one another through cell walls in which each of the cells has either one end portion sealed, is manufactured.

Here, with respect to the degreasing and firing conditions of the ceramic dried body, it is possible to apply conditions that have been conventionally used for manufacturing a filter made from porous ceramics.

By conducting the above-mentioned processes, the above-mentioned honeycomb unit according to the embodiments of the first aspect of the present invention can be manufactured.

Next, an adhesive paste to form the adhesive layer 11 is applied to each of the side faces of the honeycomb unit 20 with an even thickness to form an adhesive paste layer, and by repeating a process for successively piling up another honeycomb unit 20 on this adhesive paste layer, a honeycomb unit aggregated body having a predetermined size is manufactured.

With respect to the material for forming the adhesive paste, since it has already been explained, the explanation thereof is omitted.

Next, the honeycomb unit aggregated body is heated so that the adhesive paste layer is dried and solidified to form the adhesive layer 11.

Moreover, a cutting process by using a diamond cutter and the like is carried out on the honeycomb unit aggregated body in which a plurality of the honeycomb units 20 are bonded to one another through the adhesive layers 11 so that a ceramic block 15 having a round pillar-shape is manufactured.

By forming a sealing material layer 12 on the outer periphery of the ceramic block 15 by using the sealing material paste, a honeycomb structure 10 in which the sealing material layer 12 is formed on the peripheral portion of the round pillar-shaped ceramic block 15 having a plurality of the honeycomb units 20 bonded to one another through the adhesive layers 11.

Thereafter, a catalyst is supported on the honeycomb structure, if necessary. The supporting process of the catalyst may be carried out on the honeycomb unit prior to the manufacturing of the aggregated body.

In the case of supporting the catalyst, desirably, an alumina film having a large specific surface area is formed on the surface of the honeycomb structure, and a co-catalyst as well as a catalyst such as platinum is adhered to the surface of this alumina film.

With respect to the method for forming the alumina film on the surface of the honeycomb structure, for example, a method in which the honeycomb structure is impregnated with a solution of a metal compound containing aluminum such as $Al(NO_3)_3$ and then heated and a method in which the honeycomb structure is impregnated with a solution containing alumina powder and then heated can be mentioned.

With respect to the method for adhering the co-catalyst to the alumina film, for example, a method in which the honeycomb structure is impregnated with a solution of a metal compound containing rare earth element such as $Ce(NO_3)_3$ and then heated is proposed.

With respect to the method for supporting the catalyst on the alumina film, for example, a method in which the honeycomb structure is impregnated with, for example, a nitric acid solution of diammine dinitro platinum ($[Pt(NH_3)_2(NO_2)_2]$ $HNO_3$, platinum concentration: about 4.53% by weight) and then heated is proposed.

Moreover, the catalyst may also be supported through a method in which the catalyst is adhered to an alumina particle in advance, to impregnate the honeycomb structure with a solution containing alumina powder with a catalyst adhered thereto, and heat it thereafter.

The honeycomb unit aggregated body may be manufactured as mentioned above, that is, after a plurality of rectangular pillar-shaped honeycomb units are bonded to one another by an adhesive, the resulting body may be cut using a diamond cutter so as to process the body into a round pillar-shape, or may be manufactured by the following process; that is, manufacturing in advance a plurality of honeycomb units having a desired shape (for example, a pillar-shape having a cross-sectional shape of a sector with a central angle of 90° (quadrant), a pillar-shape having a cross-sectional shape of an almost square where one side thereof is a part of a circular arc, etc.) which form a round pillar-shape (or any desired pillar-shape such as a cylindroid shape, a rectangular pillar-shape and the like) when combined with one another, and then bonding the honeycomb units to one another with an adhesive paste to form the honeycomb unit aggregated body.

In the honeycomb structure according to the embodiments of the second aspect of the present invention, since at least one of the honeycomb units constituting the honeycomb structure is the honeycomb unit according to the embodiments of the first aspect of the present invention, a deviation of heat generation at the sealed region in the cells and the unsealed region in the cells may become easier to be effectively prevented in the entire honeycomb structure. Therefore, in the honeycomb structure according to the embodiments of the second aspect of the present invention, the plugged portion of the cells and the periphery thereof may prevent generation of damages such as cracks at the time of the regenerating process and the like, thereby more easily obtaining an improved durability.

Next, the honeycomb structure according to the embodiments of the third aspect of the present invention will be described.

The honeycomb structure according to the embodiments of the third aspect of the present invention including one honeycomb unit which has a plurality of cells which are allowed to penetrate in a longitudinal direction with a wall portion therebetween, with either one end portion of each of the cells being sealed.

In the honeycomb unit, supposing that a ratio of a weight of an unsealed region in the cells to a weight of a sealed region in the cells is Y, and a ratio of a length in the longitudinal direction of the honeycomb unit to an area of a cross-section perpendicular to the longitudinal direction of the honeycomb unit is X, these X and Y are allowed to satisfy the following inequality (1):

$$100/3 \cdot X + 5 \leq Y \leq 100/3 \cdot X + 40 \qquad (1)$$

(wherein at least about $0.1 \leq X \leq$ at most about 0.26).

More specifically, the honeycomb unit is the honeycomb unit according to the embodiments of the first aspect of the present invention (hereinafter, such a honeycomb structure is referred to also as an integral honeycomb structure).

Figure 4A:
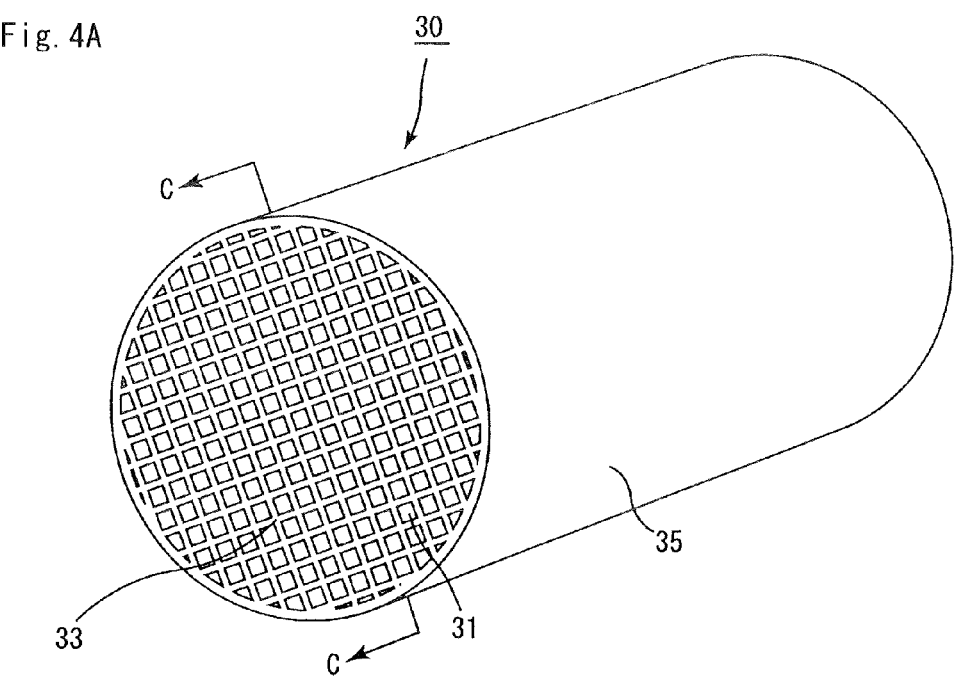
FIG. 4A is a perspective view that schematically shows one example of the honeycomb structure according to one embodiment of the third aspect of the present invention.
Figure 4B:
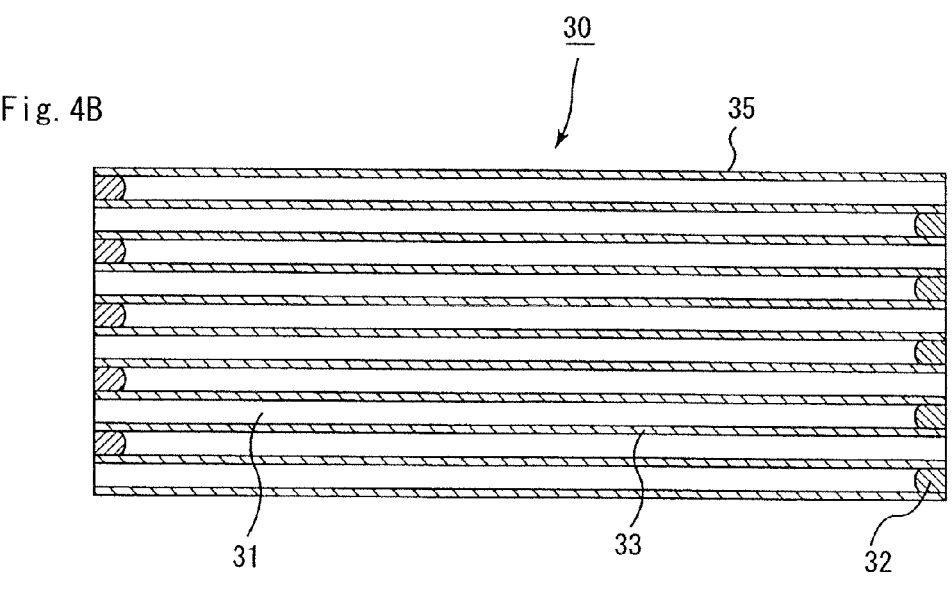
FIG. 4B is a cross-sectional view taken along line C-C of FIG. 4A.

The following description will discuss the honeycomb structure according to the embodiments of the third aspect of the present invention, by referring to FIGS. 4A and 4B.

FIG. 4A is a perspective view that schematically shows one example of the honeycomb structure according to one embodiment of the third aspect of the present invention, and FIG. 4B is a cross-sectional view taken along line C-C of FIG. 4A.

As shown in FIG. 4A, the honeycomb structure (integral honeycomb structure) 30 is formed by one round pillar-shaped honeycomb unit 35 which is a honeycomb unit in which a large number of cells 31 are disposed in parallel with one another in the longitudinal direction with a cell wall (wall portion) 33 therebetween. Here, the cell wall refers to both the cell walls that separate the cells 31 from one another, and the portion corresponding to the outer periphery of the honeycomb unit.

As shown in FIG. 4B, in the integral honeycomb structure 30, the honeycomb unit 35 has a structure in which either one of the end portions of the cell 31 of the honeycomb unit is sealed with a plug 32.

In this structure, exhaust gases that have flowed into one cell 31 are always allowed to flow out of another cell 31 after having passed through the cell wall 33 separating the cells 31 so that the cell wall 33 separating the cells 31 from each other is allowed to function as a particle capturing filter.

Moreover, although not shown in FIGS. 4A and 4B, a sealing material layer (coat layer) is formed on the periphery of the honeycomb unit 35 as in the separate-type honeycomb structure 10 shown in FIG. 3.

In the integral honeycomb structure 30 shown in FIGS. 4A and 4B, although the shape of the honeycomb unit 35 is a round pillar-shape, the shape of the one honeycomb unit constituting the integral honeycomb structure is not limited to the round pillar-shape, and may be, for example, a cylindroid shape, a rectangular pillar-shape or the like, and also may be any other shape.

Such an integral honeycomb structure 30 is a honeycomb unit which is formed as a single sintered body as a whole, wherein a plurality of cells are disposed in parallel with one another in the longitudinal direction with a cell wall (wall portion) therebetween, each of the cells having either one end portion being sealed, and in this single honeycomb unit, the ratio Y of the weight of the base portion to the weight of the plugged portion and the aspect ratio X satisfy the above-mentioned inequality (1). Therefore, it becomes less likely for damages such as cracks to occur to such an integral honeycomb structure 30 at the time of the regenerating process and the like.

With respect to the porous ceramic material forming the honeycomb structure according to the embodiments of the third aspect of the present invention, for example, the same porous ceramic material forming the above-mentioned honeycomb structure according to the embodiments of the second aspect of the present invention may be used.

Among those materials, oxide ceramics such as cordierite, aluminum titanate may be preferably used. This material cuts manufacturing costs, and has a comparatively low coefficient of thermal expansion so that breakage during use thereof is less likely to be caused.

Moreover, in the honeycomb structure according to the embodiments of the third aspect of the present invention, with respect to the porosity, pore diameter, the material for the plug, the thickness of cell walls, the material for the sealing material layer, size and kinds of the cell, etc., those factors that are the same as those of the honeycomb structure according to the embodiments of the second aspect of the present invention may be used; therefore, detailed description thereof is omitted herein.

Further, the honeycomb structure according to the embodiments of the third aspect of the present invention may be supported with a catalyst. Specific examples of the catalyst are the same as that of the honeycomb structure according to the embodiments of the second aspect of the present invention; therefore, detailed description thereof is omitted herein.

The following description will discuss one example of a method for manufacturing the honeycomb structure according to the embodiments of the third aspect of the present invention (the integral honeycomb structure).

First, an extrusion-molding process is carried out by using material paste mainly including the above-mentioned ceramic material so that a round pillar-shaped ceramic molded body is manufactured. Here, except that the shape of the molded body is a cylinder and that the dimension is larger in comparison with the separate-type honeycomb structure, the same binder, dispersant and the like as those of the separate-type honeycomb structure are used, and the molded body is formed by using the same method; therefore, detailed description thereof is omitted herein.

Next, in the same manner as the manufacturing process of the separate-type honeycomb structure, the above-mentioned ceramic molded body is dried by using a drier such as a microwave drier, a hot-air drier, a dielectric drier, a reduced-pressure drier, a vacuum drier and a freeze drier so that a ceramic dried body is formed. Thereafter, a predetermined amount of plug material paste forming a plug is injected into the end portion on the outlet side of the inlet-side group of cells and the end portion on the inlet side of the outlet-side group of cells to seal the cells in such a manner that the above-mentioned inequality (1) is satisfied.

Thereafter, in the same manner as the manufacturing process of the separate-type honeycomb structure, the degreasing and sintering processes are carried out to manufacture a ceramic block. Then, if necessary, a cutting process or forming of the sealing material paste is carried out so that the honeycomb structure according to the third aspect of the present invention (integral honeycomb structure) is manufactured. Further, a catalyst may also be supported on the integral honeycomb structure through the above-mentioned method.

Although the use of the honeycomb structure according to the embodiments of the second and third aspects of the present invention are not particularly limited, they are desirably applied to an exhaust gas purifying device for a vehicle.

Figure 5:
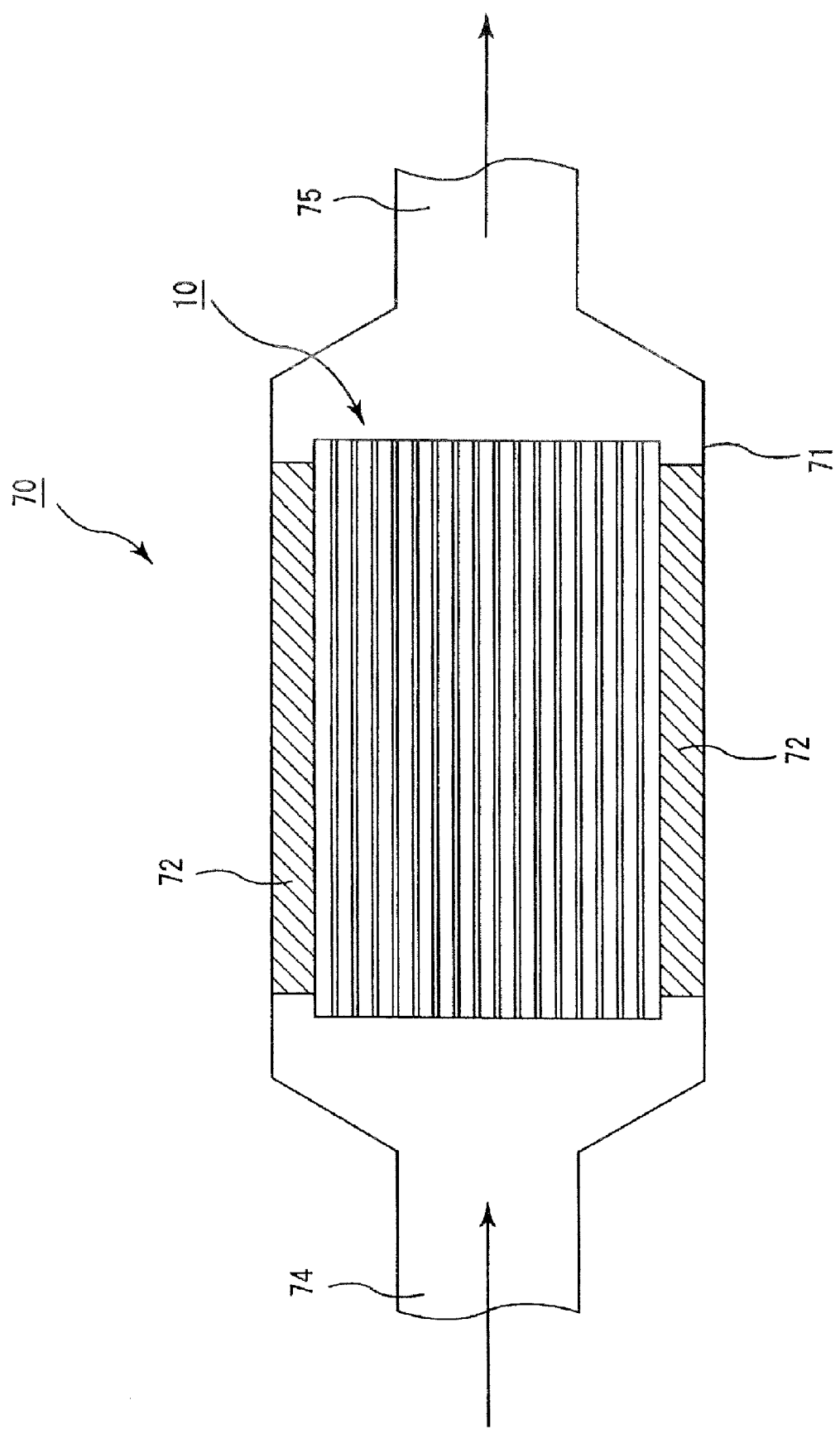
FIG. 5 is a cross-sectional view that schematically shows one example of the exhaust gas purifying device of a vehicle to which the honeycomb structure according to one embodiment of the second aspect of the present invention is placed.

FIG. 5 is a cross-sectional view that schematically shows one example of the exhaust gas purifying device of a vehicle to which the honeycomb structure according to the embodiments of the second aspect of the present invention is placed. Here, an exhaust gas purifying device having the honeycomb structure according to the embodiments of the second aspect of the present invention placed thereto is shown, but the configuration thereof is the same even when the honeycomb structure according to the embodiments of the third aspect of the present invention is placed thereto.

As shown in FIG. 5, an exhaust gas purifying device 70 is mainly configured by a honeycomb structure 10, a casing 71 that covers the outside of the honeycomb structure 10, and a holding sealing material 72 placed between the honeycomb structure 10 and the casing 71, and an introducing pipe 74 coupled to an internal combustion system such as an engine is connected to the end portion of the casing 71 on the side to which exhaust gases are introduced, with an exhaust pipe 75 coupled to the outside being connected to the other end portion of the casing 71. In FIG. 5, arrows indicate flows of exhaust gases.

In the exhaust gas purifying device 70 having the above-mentioned configuration, exhaust gases discharged from the internal-combustion system such as an engine, are introduced into the casing 71 through the introducing pipe 74, and allowed to flow into the honeycomb structure from the inlet side cells and pass through a cell wall so that, after PM therein have been captured through this cell wall to purify the exhaust gases, the resulting exhaust gases are discharged outside the honeycomb structure from the outlet side cells through the exhaust pipe 75. Moreover, when the catalyst that is allowed to convert gases is supported on the honeycomb structure, toxic gas components such as CO, HC, NOx in exhaust gases may be easily converted.

In the exhaust gas purifying device 70, when a large amount of PM accumulate on the cell wall and the pressure loss becomes high, a regenerating process of the honeycomb structure is carried out.

In the regenerating process, PM may be burned and removed using a post-injection method, or a reaction heat deriving from the purification of the above-mentioned toxic gas components, may be used. Moreover, the PM that accumulate on the cell wall may be burned and removed through a method in which the honeycomb structure is heated by allowing gases which are heated by a heating means, which is not shown in Figures, to flow into the cells of the honeycomb structure.

Moreover, in the honeycomb structure according to the embodiments of the third aspect of the present invention, the honeycomb structure includes one honeycomb unit which is the honeycomb unit according to the embodiments of the first aspect of the present invention. Therefore, a deviation of heat generation at the sealed region in the cells and the unsealed region in the cells may become easier to be effectively prevented in the entire honeycomb structure. Thus, in the honeycomb structure according to the embodiments of the third aspect of the present invention, the plugged portion of the cells and the periphery thereof may prevent generation of damages such as cracks at the time of the regenerating process and the like, thereby more easily obtaining an improved durability.

EXAMPLES

The following description will discuss the present invention in detail by means of examples; however, the present invention is not intended to be limited by these examples.

Example 1

Coarse powder of α-type silicon carbide having an average particle diameter of 22 μm (52.2% by weight) and fine powder of α-type silicon carbide having an average particle diameter of 0.5 μm (22.4% by weight) were wet-mixed, and to the resulting mixture were added and kneaded 4.8% by weight of acrylic resin, 2.6% by weight of an organic binder (methyl cellulose), 2.9% by weight of a lubricant (UNILUB made by NOF Corp.), 1.3% by weight of glycerin and 13.8% by weight of water to obtain a mixed composition, and this was then extrusion-molded to manufacture a raw molded body having the same shape as the honeycomb unit 20 shown in FIG. 1A and FIG. 1B, except that the end portion of the cell was not sealed.

Next, after the above-mentioned raw molded body had been dried by using a micro-wave drier or the like to prepare a ceramic dried body, predetermined cells were filled with a plug material paste having the composition as described below. In the present process, upon injecting the plug material paste, the plug material paste was injected so that the plugged portion after the firing process was formed to have a length of 1.7 mm.

With respect to the plug material paste, coarse powder of α-type silicon carbide having an average particle diameter of 11 μm (59.8% by weight) and fine powder of α-type silicon carbide having an average particle diameter of 0.5 μm (14.9% by weight) were wet-mixed, and to the resulting mixture were added and kneaded a binder (Binder D) (7.0% by weight), a lubricant (UNILUB, made by NOF Corp.) (4.5% by weight), a dispersant (PLYSURF, made by DAI-ICHI KOGYO SEIYAKU Co., Ltd.) (1.9% by weight), and a solvent (diethylene glycol mono-2-ethylhexyl ether, KYOWANOL OX20 made by Kyowa Hakko Chemical Co., Ltd) (12.0% by weight) so that a mixed composition was prepared to be used as the plug material paste.

Next, after the above-mentioned ceramic dried body sealed with the plug material paste had been again dried by using a drier, the resulting product was degreased at 400° C., and fired at 2200° C. in a normal-pressure argon atmosphere for 3 hours to manufacture a honeycomb unit 20 formed of a silicon carbide sintered body and having a porosity of the honeycomb unit of 47.5%, an average pore diameter of 12.5 μm, having a size of 34.3 mm×34.3 mm×150 mm, the number of cells 21 (cell density) of 46.5 pcs/cm$^2$, a thickness of the cell walls 23 of 0.25 mm, an aperture ratio of 68.8%, an apparent density of the base portion of 0.52 g/cm$^3$, a porosity of the plug of 47.5%, and an apparent density of the plugged portion of 1.10 g/cm$^3$.

By using a heat resistant adhesive paste containing 30% by weight of alumina fibers having an average fiber length of 20 μm, 21% by weight of silicon carbide particles having an average particle diameter of 0.6 μm, 15% by weight of silica sol, 5.6% by weight of carboxymethyl cellulose and 28.4% by weight of water, a number of the honeycomb units 20 were bonded to one another, and this was dried at 120° C. and then cut by using a diamond cutter so that a round pillar-shaped ceramic block 15 having the adhesive layer with a thickness of 1 mm was manufactured.

Next, ceramic fibers (shot content: 3%, average fiber length: 100 μm) (23.3% by weight) made of aluminosilicate, which served as inorganic fibers, silicon carbide powder having an average particle diameter of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the peripheral portion of the ceramic block 15 by using the above-mentioned sealing material paste. Further, this sealing material paste layer was dried at 120° C. so that a round pillar-shaped separate-type honeycomb structure 10 having a size of 143.8 mm in diameter×150 mm in length was manufactured.

Examples 2 to 12

A separate-type honeycomb structure was manufactured through the same processes as in Example 1, except that the length of the honeycomb unit, and the length of the plugged portion were set to the values shown in Table 1-1.

Example 13

A separate-type honeycomb structure was manufactured through the same processes as in Example 1, except that the size of the honeycomb unit was set to 40 mm×40 mm×250 mm, and the length of the plugged portion was set to 6.0 mm.

Example 14

A separate-type honeycomb structure was manufactured through the same processes as in Example 1, except that the size of the honeycomb unit was set to 25 mm×25 mm×150 mm, and the length of the plugged portion was set to 2.0 mm.

Example 15

Coarse powder of α-type silicon carbide having an average particle diameter of 22 μm (54.6% by weight) and fine powder of α-type silicon carbide having an average particle diameter of 0.5 μm (23.4% by weight) were wet-mixed, and to the resulting mixture were added and kneaded 4.3% by weight of an organic binder (methyl cellulose), 2.6% by weight of a lubricant (UNILUB made by NOF Corp.), 1.2% by weight of glycerin and 13.9% by weight of water to obtain a mixed composition, and this was then extrusion-molded to manufacture a raw molded body having the same shape as the honeycomb unit 20 shown in FIG. 1A and FIG. 1B, except that the end portion of the cell was not sealed.

Next, after the above-mentioned raw molded body had been dried by using a micro-wave drier or the like to prepare a ceramic dried body, predetermined cells were filled with a plug material paste having the composition as described below. In the present process, upon injecting the plug material paste, the plug material paste was injected so that the plugged portion after the firing process was formed to have a length of 2.0 mm.

With respect to the plug material paste, coarse powder of α-type silicon carbide having an average particle diameter of 11 μm (61.2% by weight) and fine powder of α-type silicon carbide having an average particle diameter of 0.5 μm (15.3% by weight) were wet-mixed, and to the resulting mixture were added and kneaded a binder (Binder D) (6.4% by weight), a lubricant (UNILUB, made by NOF Corp.) (3.8% by weight), a dispersant (PLYSURF, made by DAI-ICHI KOGYO SEIYAKU Co., Ltd.) (1.8% by weight), and a solvent (KYOWANOL OX20 made by Kyowa Hakko Chemical Co., Ltd) (11.5% by weight) so that a mixed composition was prepared to be used as the plug material paste.

Next, after the above-mentioned ceramic dried body sealed with the plug material paste had been again dried by using a drier, the resulting product was degreased at 400° C., and fired at 2200° C. in a normal-pressure argon atmosphere for 3 hours to manufacture a honeycomb unit 20 formed of a silicon carbide sintered body and having a porosity of the honeycomb unit of 42.0%, an average pore diameter of 12.5 μm, having a size of 34.3 mm×34.3 mm×150 mm, the number of cells 21 (cell density) of 46.5 pcs/cm$^2$, a thickness of the cell walls 23 of 0.2 mm, an aperture ratio of 74.6%, an apparent density of the base portion of 0.47 g/cm$^3$, a porosity of the plug of 45.0%, and an apparent density of the plugged portion of 1.13 g/cm$^3$.

Next, as in the processes of Example 1, processes such as the bonding of honeycomb units, the cutting process, forming of the sealing material paste layer, and drying were carried out to manufacture a separate-type honeycomb structure.

Examples 16 to 18

A separate-type honeycomb structure was manufactured through the same processes as in Example 15, except that the length of the honeycomb unit, and the length of the plugged portion were set to the values shown in Table 1-1.

Example 19

Coarse powder of α-type silicon carbide having an average particle diameter of 22 μm (52.8% by weight) and fine powder of α-type silicon carbide having an average particle diameter of 0.5 μm (22.6% by weight) were wet-mixed, and to the resulting mixture were added and kneaded 4.6% by weight of an organic binder (methyl cellulose), 2.1% by weight of a plasticizer (UNILUB made by NOF Corp.), 1.3% by weight of glycerin and 13.9% by weight of water to obtain a mixed composition, and this was then extrusion-molded to manufacture a raw molded body having the same shape as the honeycomb unit 20 shown in FIG. 1A and FIG. 1B, except that the end portion of the cell was not sealed.

Next, after the above-mentioned raw molded body had been dried by using a micro-wave drier or the like to prepare a ceramic dried body, predetermined cells were filled with a plug material paste having the composition as described below. In the present process, upon injecting the plug material paste, the plug material paste was injected so that the plugged portion after the firing process was formed to have a length of 1.5 mm.

With respect to the plug material paste, coarse powder of α-type silicon carbide having an average particle diameter of 11 μm (61.2% by weight) and fine powder of α-type silicon carbide having an average particle diameter of 0.5 μm (15.3% by weight) were wet-mixed, and to the resulting mixture were added and kneaded a binder (Binder D) (6.4% by weight), a lubricant (UNILUB, made by NOF Corp.) (3.8% by weight), a dispersant (PLYSURF, made by DAI-ICHI KOGYO SEIYAKU Co., Ltd.) (1.8% by weight), and a solvent (KYOWANOL OX20 made by Kyowa Hakko Chemical Co., Ltd) (11.5% by weight) so that a mixed composition was prepared to be used as the plug material paste.

Next, after the above-mentioned ceramic dried body sealed with the plug material paste had been again dried by using a drier, the resulting product was degreased at 400° C., and fired at 2200° C. in a normal-pressure argon atmosphere for 3 hours to manufacture a honeycomb unit 20 formed of a silicon carbide sintered body and having a porosity of the honeycomb unit of 45.0%, an average pore diameter of 12.5 μm, having a size of 34.3 mm×34.3 mm×150 mm, the number of cells 21 (cell density) of 54.3 pcs/cm$^2$, a thickness of the cell walls 23 of 0.175 mm, an aperture ratio of 75.9%, an apparent density of the base portion of 0.42 g/cm$^3$, a porosity of the plug of 45.0%, and an apparent density of the plugged portion of 1.09 g/cm$^3$.

Next, as in the processes of Example 1, processes such as the bonding of honeycomb units, the cutting process, forming of the sealing material paste layer, and drying were carried out to manufacture a separate-type honeycomb structure.

Example 20

A separate-type honeycomb structure was manufactured through the same processes as in Example 19, except that the length of the plugged portion was set to the values shown in Table 1-1.

Example 21

Coarse powder of α-type silicon carbide having an average particle diameter of 22 μm (52.8% by weight) and fine powder of α-type silicon carbide having an average particle diameter of 0.5 μm (22.6% by weight) were wet-mixed, and to the resulting mixture were added and kneaded 4.6% by weight of an organic binder (methyl cellulose), 2.1% by weight of a lubricant (UNILUB made by NOF Corp.), 1.3% by weight of glycerin and 13.9% by weight of water to obtain a mixed composition, and this was then extrusion-molded to manufacture a raw molded body having the same shape as the honeycomb unit 20 shown in FIG. 1A and FIG. 1B, except that the end portion of the cell was not sealed.

Next, after the above-mentioned raw molded body had been dried by using a micro-wave drier or the like to prepare a ceramic dried body, predetermined cells were filled with a plug material paste having the composition as described below. In the present process, upon injecting the plug material paste, the plug material paste was injected so that the plugged portion after the firing process was formed to have a length of 3.0 mm.

With respect to the plug material paste, coarse powder of α-type silicon carbide having an average particle diameter of 11 μm (61.2% by weight) and fine powder of α-type silicon carbide having an average particle diameter of 0.5 μm (15.3% by weight) were wet-mixed, and to the resulting mixture were added and kneaded a binder (Binder D) (6.4% by weight), a lubricant (UNILUB, made by NOF Corp.) (3.8% by weight), a dispersant (PLYSURF, made by DAI-ICHI KOGYO SEIYAKU Co., Ltd.) (1.8% by weight), and a solvent (KYOWANOL OX20 made by Kyowa Hakko Chemical Co., Ltd) (11.5% by weight) so that a mixed composition was prepared to be used as the plug material paste.

Next, after the above-mentioned ceramic dried body sealed with the plug material paste had been again dried by using a drier, the resulting product was degreased at 400° C., and fired at 2200° C. in a normal-pressure argon atmosphere for 3 hours to manufacture a honeycomb unit 20 formed of a silicon carbide sintered body and having a porosity of the honeycomb unit of 45.0%, an average pore diameter of 12.5 μm, having a size of 34.3 mm×34.3 mm×150 mm, the number of cells 21 (cell density) of 31.0 pcs/cm$^2$, a thickness of the cell walls 23 of 0.4 mm, an aperture ratio of 60.4%, an apparent density of the base portion of 0.70 g/cm$^3$, a porosity of the plug of 45.0%, and an apparent density of the plugged portion of 1.23 g/cm$^3$.

Next, as in the processes of Example 1, processes such as the bonding of honeycomb units, the cutting process, forming of the sealing material paste layer, and drying were carried out to manufacture a separate-type honeycomb structure.

Example 22

A separate-type honeycomb structure was manufactured through the same processes as in Example 21, except that the length of the plugged portion was set to the value shown in Table 1-1.

Comparative Examples 1 to 8

A separate-type honeycomb structure was manufactured through the same processes as in Example 1, except that the length of the honeycomb unit, and the length of the plugged portion were set to the values shown in Table 1-2.

The apparent density of the base portion and the apparent density of the plugged portion in the respective Examples and Comparative Examples were obtained through calculating the porosity and aperture ratio.

In the respective Examples and Comparative Examples, the characteristics of each of the honeycomb unit, base portion, and plugged portion were measured through the methods mentioned below.

(1) Measurement on the Porosity of the Honeycomb Unit and Plugged Portion

The pore distribution was measured through a mercury injection method with respect to fine pores in a range of fine pore diameters from 0.1 to 360 μm by using a porosimeter (AutoPore III 9420, manufactured by Shimadzu Corp.) by a mercury injection method.

(2) Measurement of the Length of the Plugged Portion

The honeycomb unit was cut through the sealed portion of the cells corresponding to the plugged portion, and the length of the plugged portion was measured using a length measuring microscope.

(3) Weight Measurement of the Base Portion and Plugged Portion

The honeycomb unit was cut apart to the base portion and the plugged portion and the weight thereof were measured respectively.

Moreover, the honeycomb structures manufactured in the Examples and Comparative Examples were judged as to whether cracks were caused therein or not.

More specifically, the manufactured honeycomb structures were connected to a diesel engine, and this engine was driven so that the honeycomb structure captured 8 g/L of PM. Thereafter, a regenerating process of the honeycomb structure was carried out through a post-injection method.

Then, after the regenerating process had been completed, the honeycomb structure was visually observed as to whether or not cracks are caused therein.

The results were as shown in Tables 1-1 and 1-2. Now, in Tables 1-1 and 1-2, the honeycomb structures judged to have no cracks therein were marked "○" while those judged to have cracks therein were marked "x".

Here, the portion having damages such as cracks generated therein is shown in the "Damaged portion" columns in Tables 1-1 and 1-2. "Interface neighborhood" is shown when damages were observed at the interface between the plugged portion and the base portion, and the periphery thereof; "plugged portion" is shown when damages were observed at the plugged portion; and "-" is shown when damages were not observed.

TABLE 1-1

| | Whole length (mm) | Cross-sectional area (mm$^2$) | Aspect ratio (X) | Length of plugged portion (mm) | Weight of base portion (g) | Weight of plugged portion (g) | Weight ratio (Y) | Value of (100/3 · X + 5) | Value of (100/3 · X + 40) | Judgment | Damaged portion |
|---|---|---|---|---|---|---|---|---|---|---|---|
| Example 1 | 150 | 1176 | 0.13 | 1.7 | 91.4 | 2.2 | 41.5 | 9.2 | 44.2 | ○ | n/a |
| Example 2 | 150 | 1176 | 0.13 | 7.0 | 88.2 | 9.1 | 9.7 | 9.2 | 44.2 | ○ | n/a |
| Example 3 | 150 | 1176 | 0.13 | 3.0 | 90.6 | 3.9 | 23.3 | 9.2 | 44.2 | ○ | n/a |
| Example 4 | 300 | 1176 | 0.25 | 3.0 | 183.1 | 3.9 | 47.1 | 13.5 | 48.5 | ○ | n/a |
| Example 5 | 300 | 1176 | 0.25 | 10.0 | 178.8 | 13.0 | 13.8 | 13.5 | 48.5 | ○ | n/a |
| Example 6 | 300 | 1176 | 0.25 | 5.0 | 181.9 | 6.5 | 28.1 | 13.5 | 48.5 | ○ | n/a |
| Example 7 | 120 | 1176 | 0.10 | 1.4 | 73.1 | 1.8 | 40.3 | 8.4 | 43.4 | ○ | n/a |

TABLE 1-1-continued

|  | Whole length (mm) | Cross-sectional area (mm$^2$) | Aspect ratio (X) | Length of plugged portion (mm) | Weight of base portion (g) | Weight of plugged portion (g) | Weight ratio (Y) | Value of (100/3·X + 5) | Value of (100/3·X + 40) | Judgment | Damaged portion |
|---|---|---|---|---|---|---|---|---|---|---|---|
| Example 8 | 120 | 1176 | 0.10 | 6.0 | 70.3 | 7.8 | 9.0 | 8.4 | 43.4 | ○ | n/a |
| Example 9 | 120 | 1176 | 0.10 | 2.5 | 72.4 | 3.2 | 22.3 | 8.4 | 43.4 | ○ | n/a |
| Example 10 | 250 | 1176 | 0.21 | 2.7 | 152.4 | 3.5 | 43.6 | 12.1 | 47.1 | ○ | n/a |
| Example 11 | 250 | 1176 | 0.21 | 9.0 | 148.6 | 11.7 | 12.7 | 12.1 | 47.1 | ○ | n/a |
| Example 12 | 250 | 1176 | 0.21 | 4.0 | 151.6 | 5.2 | 29.2 | 12.1 | 47.1 | ○ | n/a |
| Example 13 | 250 | 1600 | 0.16 | 6.0 | 204.6 | 10.6 | 19.3 | 10.2 | 45.2 | ○ | n/a |
| Example 14 | 150 | 625 | 0.24 | 2.0 | 48.5 | 1.4 | 35.2 | 13.0 | 48.0 | ○ | n/a |
| Example 15 | 150 | 1176 | 0.13 | 2.0 | 82.1 | 2.7 | 30.9 | 9.2 | 44.2 | ○ | n/a |
| Example 16 | 150 | 1176 | 0.13 | 5.0 | 80.5 | 6.6 | 12.1 | 9.2 | 44.2 | ○ | n/a |
| Example 17 | 300 | 1176 | 0.25 | 3.0 | 164.8 | 4.0 | 41.4 | 13.5 | 48.5 | ○ | n/a |
| Example 18 | 300 | 1176 | 0.25 | 7.0 | 162.6 | 9.3 | 17.5 | 13.5 | 48.5 | ○ | n/a |
| Example 19 | 150 | 1176 | 0.13 | 1.5 | 74.2 | 1.9 | 38.5 | 9.2 | 44.2 | ○ | n/a |
| Example 20 | 150 | 1176 | 0.13 | 6.0 | 71.9 | 7.7 | 9.3 | 9.2 | 44.2 | ○ | n/a |
| Example 21 | 150 | 1176 | 0.13 | 3.0 | 120.5 | 4.3 | 27.8 | 9.2 | 44.2 | ○ | n/a |
| Example 22 | 150 | 1176 | 0.13 | 8.0 | 116.4 | 11.6 | 10.1 | 9.2 | 44.2 | ○ | n/a |

(Note)
About the damaged portion referred to in the table
n/a: No damage observed

TABLE 1-2

|  | Whole length (mm) | Cross-sectional area (mm$^2$) | Aspect ratio (X) | Length of plugged portion (mm) | Weight of base portion (g) | Weight of plugged portion (g) | Weight ratio (Y) | Value of (100/3·X + 5) | Value of (100/3·X + 40) | Judgement | Damaged portion |
|---|---|---|---|---|---|---|---|---|---|---|---|
| Comparative Example 1 | 150 | 1176 | 0.13 | 1.5 | 91.5 | 1.9 | 47.1 | 9.2 | 44.2 | x | Plugged portion |
| Comparative Example 2 | 150 | 1176 | 0.13 | 8.0 | 87.5 | 10.4 | 8.4 | 9.2 | 44.2 | x | Interface neighborhood |
| Comparative Example 3 | 300 | 1176 | 0.25 | 2.7 | 183.3 | 3.5 | 52.4 | 13.5 | 48.5 | x | Plugged portion |
| Comparative Example 4 | 300 | 1176 | 0.25 | 11.0 | 178.2 | 14.3 | 12.5 | 13.5 | 48.5 | x | Interface neighborhood |
| Comparative Example 5 | 120 | 1176 | 0.10 | 1.2 | 73.2 | 1.6 | 47.1 | 8.4 | 43.4 | x | Plugged portion |
| Comparative Example 6 | 120 | 1176 | 0.10 | 7.0 | 69.7 | 9.1 | 7.7 | 8.4 | 43.4 | x | Interface neighborhood |
| Comparative Example 7 | 250 | 1176 | 0.21 | 2.3 | 152.7 | 3.0 | 51.2 | 12.1 | 47.1 | x | Plugged portion |
| Comparative Example 8 | 250 | 1176 | 0.21 | 10.0 | 147.9 | 13.0 | 11.4 | 12.1 | 47.1 | x | Interface neighborhood |

(Note)
About the damaged portion referred to in the table
Plugged portion: Damages were observed at the plug and/or the cell wall that contacts the plug.
Interface neighborhood: Damages were observed at the interface between the plugged portion and the base portion and/or the periphery thereof.

Figure 6:
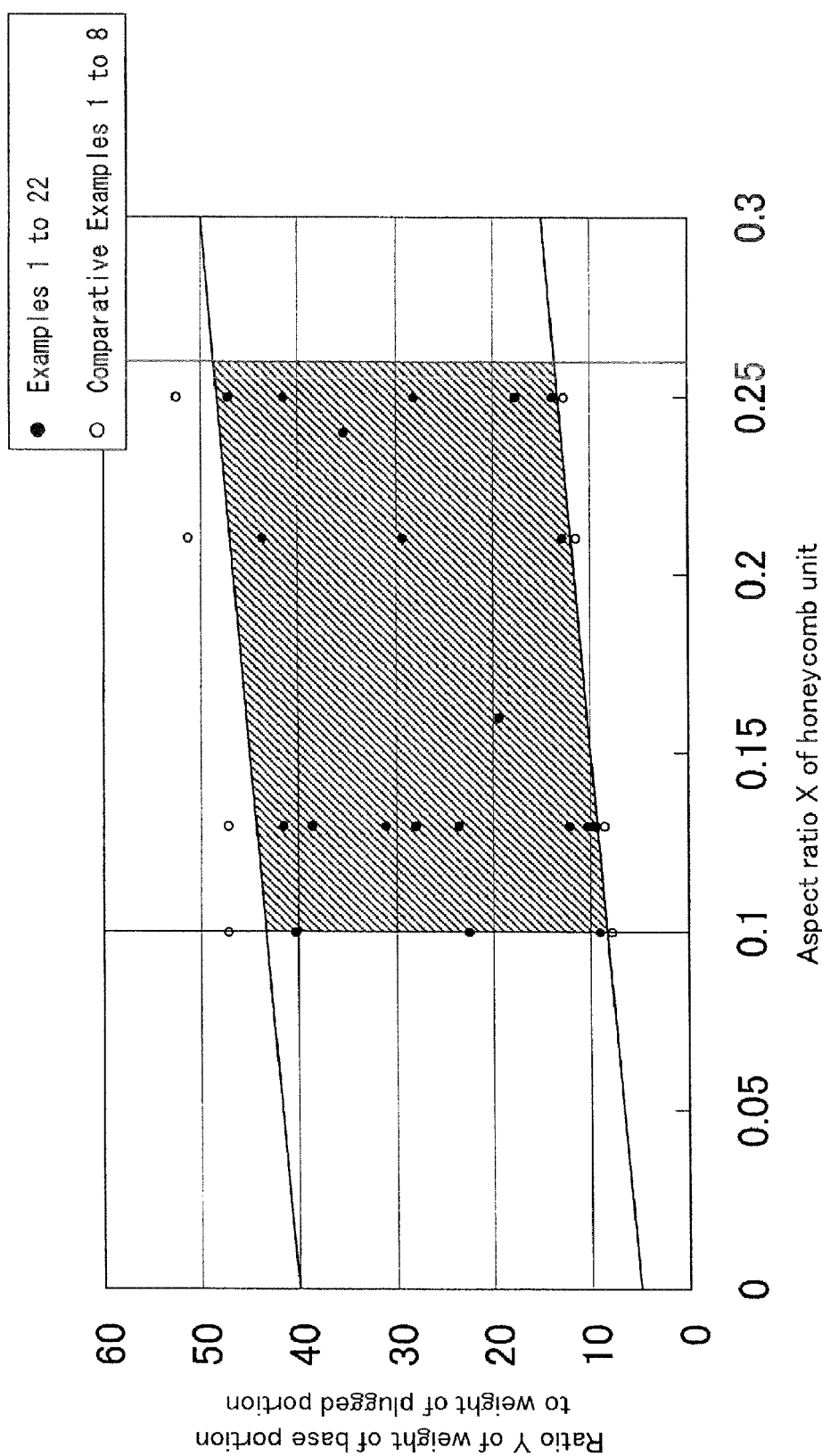
FIG. 6 is a graph showing a relationship between the ratio Y of the weight of the base portion to the weight of the plugged portion and the aspect ratio X of the honeycomb units in the Examples and Comparative Examples.

As shown in Tables 1-1, 1-2 and FIG. 6, in the honeycomb structure of the Examples in which the ratio Y of the weight of the base portion to the weight of the plugged portion and the aspect ratio X satisfy the above-mentioned inequality (1), there were no occurrence of cracks, whereas in the honeycomb structure of the Comparative Examples, cracks occurred at the periphery of the interface between the plugged portion and the base portion, or within the plugged portion itself.

FIG. 6 is a graph showing the relationship between the ratio Y of the weight of the base portion to the weight of the plugged portion and the aspect ratio X of the honeycomb units in the Examples and Comparative Examples. Further, in this graph, the value of the respective honeycomb units of Examples 1 to 22 is plotted by a filled dot ("●"), and the value of the respective honeycomb units of Comparative Examples 1 to 8 is plotted by an open dot ("○").

More specifically, as shown in FIG. 6, the honeycomb structure manufactured by using the honeycomb unit that satisfies the above-mentioned inequality (1), i.e., the honeycomb units plotted within the shaded part of the graph, had no occurrence of cracks, whereas in the honeycomb structure manufactured by using the honeycomb unit in which the value of the ratio Y is larger than the value of (100/3·X+40) i.e., the honeycomb structures of Comparative Examples 1, 3, 5 and 7, there was an occurrence of cracks within the plugged portion, and in the honeycomb structure of which was manufactured by using the honeycomb unit in which the value of the ratio Y is smaller than the value of (100/3·X+5) i.e., the honeycomb structures of Comparative Examples 2, 4, 6 and 8, there was an occurrence of cracks at the periphery of the interface between the plugged portion and the base portion.

As a consequence, it became clear from the Examples and Comparative Examples that, in the honeycomb structure of which was manufactured by using the honeycomb unit that satisfies the above-mentioned inequality (1), the plugged portion of the cells and the periphery thereof may prevent damages such as cracks at the time of the regenerating process and the like, thereby more easily obtaining an improved durability.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb unit comprising:
  a plurality of walls; and
  a plurality of cells which are defined by the plurality of walls and which extend along a longitudinal direction of the honeycomb unit, each of said plurality of cells having opposite first and second end portions along the longitudinal direction, either one of the first and second end portions being sealed, X and Y satisfying a following relationship $100/3 \cdot X + 5 \leq Y \leq 100/3 \cdot X + 40$ wherein Y is a ratio of a weight of an unsealed region in said cells to a weight of a sealed region in said cells, and wherein X is a ratio of a length in the longitudinal direction of said honeycomb unit to an area of a cross-section perpendicular to the longitudinal direction of said honeycomb unit, and X is at least about 0.1 and at most about 0.26.

2. The honeycomb unit according to claim 1, wherein
  an apparent density of the unsealed region in said cells of said honeycomb unit is at least about 0.4 g/cm$^3$ and at most about 0.7 g/cm$^3$.

3. The honeycomb unit according to claim 1, wherein
  an apparent density of the sealed region in said cells of said honeycomb unit is at least about 0.4 g/cm$^3$ and at most about 2.0 g/cm$^3$.

4. The honeycomb unit according to claim 1, wherein
  said honeycomb unit comprises silicon carbide based ceramics.

5. The honeycomb unit according to claim 1, wherein
  said honeycomb unit and the plug of the sealed region comprise the same porous ceramic.

6. The honeycomb unit according to claim 1, wherein
  said honeycomb unit and the plug of the sealed region comprise silicon carbide based ceramics.

7. The honeycomb unit according to claim 1, wherein
  a catalyst is supported on said honeycomb unit.

8. A honeycomb structure comprising:
  a plurality of honeycomb units; and
  at least one adhesive layer bonding the plurality of honeycomb units, each of the plurality of honeycomb units comprising:
    a plurality of walls; and
    a plurality of cells which are defined by the plurality of walls and which extend along a longitudinal direction of the honeycomb unit, each of said plurality of cells having opposite first and second end portions along the longitudinal direction, either one of the first and second end portions being sealed, X and Y satisfying a following relationship $100/3 \cdot X + 5 \leq Y \leq 100/3 \cdot X + 40$ wherein Y is a ratio of a weight of an unsealed region in said cells to a weight of a sealed region in said cells, and
  wherein X is a ratio of a length in the longitudinal direction of said honeycomb unit to an area of a cross-section perpendicular to the longitudinal direction of said honeycomb unit, and X is at least about 0.1 and at most about 0.26.

9. The honeycomb structure according to claim 8, wherein
  in at least one of said honeycomb units, an apparent density of the unsealed region in said cells is at least about 0.4 g/cm$^3$ and at most about 0.7 g/cm$^3$.

10. The honeycomb structure according to claim 8, wherein
  in at least one of said honeycomb units, an apparent density of the sealed region in said cells is at least about 0.4 g/cm$^3$ and at most about 2.0 g/cm$^3$.

11. The honeycomb structure according to claim 8, wherein
  at least one of said honeycomb units comprises silicon carbide based ceramics.

12. The honeycomb structure according to claim 8, wherein
  in at least one of said honeycomb units, said honeycomb unit and the plug of the sealed region comprise the same porous ceramic.

13. The honeycomb structure according to claim 8, wherein
  in at least one of said honeycomb units, said honeycomb unit and the plug of the sealed region comprise silicon carbide based ceramics.

14. The honeycomb structure according to claim 8, wherein
  a catalyst is supported on said honeycomb structure.

15. The honeycomb structure according to claim 8, wherein
  said honeycomb structure is applied to an exhaust gas purifying device for a vehicle.

16. A honeycomb structure comprising:
  one honeycomb unit comprising:
    a plurality of walls; and
    a plurality of cells which are defined by the plurality of walls and which extend along a longitudinal direction of the honeycomb unit, each of said plurality of cells having opposite first and second end portions along the longitudinal direction, either one of the first and second end portions being sealed, X and Y satisfying a following relationship $100/3 \cdot X + 5 \leq Y \leq 100/3 \cdot X + 40$ wherein Y is a ratio of a weight of an unsealed region in said cells to a weight of a sealed region in said cells, and
  wherein X is a ratio of a length in the longitudinal direction of said honeycomb unit to an area of a cross-section perpendicular to the longitudinal direction of said honeycomb unit, and X is at least about 0.1 and at most about 0.26.

17. The honeycomb structure according to claim 16, wherein
an apparent density of the unsealed region in said cells of said honeycomb unit is at least about 0.4 g/cm$^3$ and at most about 0.7 g/cm$^3$.

18. The honeycomb structure according to claim 16, wherein
an apparent density of the sealed region in said cells of said honeycomb unit is at least about 0.4 g/cm$^3$ and at most about 2.0 g/cm$^3$.

19. The honeycomb structure according to claim 16, wherein
said honeycomb unit comprises cordierite or aluminum titanate.

20. The honeycomb structure according to claim 16, wherein
said honeycomb unit and the plug of the sealed region comprise the same porous ceramic.

21. The honeycomb structure according to claim 16, wherein
said honeycomb unit and the plug of the sealed region comprise cordierite or aluminum titanate.

22. The honeycomb structure according to claim 16, wherein
a catalyst is supported on said honeycomb structure.

23. The honeycomb structure according to claim 16, wherein
said honeycomb structure is applied to an exhaust gas purifying device for a vehicle.

* * * * *